(12) United States Patent
Narita (10) Patent No.: US 12,393,375 B2
(45) Date of Patent: Aug. 19, 2025

(54) NON-TRANSITORY COMPUTER-READABLE MEDIUM STORING SUPPORT PROGRAM

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/933,521

(22) Filed: Sep. 20, 2022

(65) Prior Publication Data

US 2023/0102837 A1 Mar. 30, 2023

(30) Foreign Application Priority Data

Sep. 29, 2021 (JP) .................................. 2021-159236

(51) Int. Cl.
*G06F 3/12* (2006.01)

(52) U.S. Cl.
CPC .......... *G06F 3/1205* (2013.01); *G06F 3/1204* (2013.01); *G06F 3/1237* (2013.01)

(58) Field of Classification Search
CPC ..... G06F 3/1205; G06F 3/1204; G06F 3/1237
See application file for complete search history.

(56) References Cited

U.S. PATENT DOCUMENTS

2010/0027040 A1* 2/2010 Kuroda ................ G06F 3/1256
358/1.9
2010/0231629 A1* 9/2010 Kobayashi ............... B41J 29/38
347/14
2013/0100470 A1* 4/2013 Kumagai ........... H04N 1/00482
358/1.9

(Continued)

FOREIGN PATENT DOCUMENTS

JP 2002-259080 A 9/2002
JP 2015-139902 A 8/2015

(Continued)

OTHER PUBLICATIONS

International Search Report and Written Opinion dated Oct. 25, 2022 from related application PCT/JP2022/034171 together with English language translations.

*Primary Examiner* — Helen Zong
(74) *Attorney, Agent, or Firm* — Scully, Scott, Murphy & Presser, PC (57) ABSTRACT

A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform: when a print instruction is output from an application program installed in the information processing device and transferred to the general-purpose print program to perform printing, receiving intermediate image data according to the print instruction from the operating system; determining whether a conversion is required; and when the conversion is required, causing the printer to print a converted image obtained by converting an image indicated by the received intermediate image data from color to monochrome.

6 Claims, 6 Drawing Sheets

(56) References Cited

U.S. PATENT DOCUMENTS

| | | | |
|---|---|---|---|
| 2015/0181081 A1* | 6/2015 | Hakamada | H04N 1/50 |
| | | | 358/2.1 |
| 2018/0074764 A1 | 3/2018 | Yamashita | |
| 2018/0352068 A1* | 12/2018 | Asai | H04M 1/72406 |
| 2019/0108075 A1* | 4/2019 | Mamiya | G06F 21/44 |
| 2019/0164026 A1* | 5/2019 | Masuda | G06F 3/1212 |
| 2020/0228672 A1* | 7/2020 | Baliguat | H04N 1/00572 |
| 2020/0249882 A1* | 8/2020 | Yamada | G06F 3/1244 |
| 2020/0257482 A1* | 8/2020 | Taira | G06F 3/1254 |
| 2021/0216256 A1 | 7/2021 | Hosomizo | |
| 2021/0240407 A1* | 8/2021 | Suzuki | G06F 3/1247 |
| 2021/0334050 A1* | 10/2021 | Kohata | G06F 3/1208 |
| 2022/0405539 A1* | 12/2022 | Suzuki | H04N 1/00307 |
| 2023/0224421 A1* | 7/2023 | Shinya | H04N 1/40012 |
| | | | 358/3.01 |

FOREIGN PATENT DOCUMENTS

| | | |
|---|---|---|
| JP | 2018049581 A | 3/2018 |
| JP | 2020-126370 A | 8/2020 |
| JP | 2021-093081 A | 6/2021 |
| JP | 2021-124789 A | 8/2021 |

\* cited by examiner

NON-TRANSITORY COMPUTER-READABLE MEDIUM STORING SUPPORT PROGRAM

REFERENCE TO RELATED APPLICATIONS

This application claims priority from Japanese Patent Application No. 2021-159236 filed on Sep. 29, 2021. The entire content of the priority application is incorporated herein by reference.

BACKGROUND ART

A related art discloses a technique for converting a color image into a monochrome image. For example, the related art discloses a technique in which an extension plug-in converts an image shown in print data from color to monochrome as a process of extending the process of a printer driver in a V4 printer driver of Windows ("Windows" is a trademark of Microsoft Corporation).

DESCRIPTION

In recent years, a technique for controlling a printer by a print program built into the operating system (abbreviated to "OS") as a standard without using a printer driver has been put into practical use. In this technology, when the OS associates a printer with an OS standard print program and subsequently receives a print instruction for the printer, printing by the OS standard print program becomes possible without using a printer driver.

However, the OS standard general-purpose print program mentioned above may not support some of the functions implemented in the conventional printer driver, and may not be able to print an appropriate image on the printer. For example, the OS standard general-purpose print program may not have a function of converting an image from color to monochrome as disclosed in the above-described related art, which is inconvenient.

The present specification discloses a technique which can be expected to print an appropriate image even if an information processing device in which an OS standard general-purpose print program is installed is passed through the OS standard general-purpose print program.

A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform: based on a print instruction being output from an application program installed in the information processing device and transferred to the general-purpose print program to cause the printer to perform printing, receiving intermediate image data according to the print instruction from the operating system; determining whether a conversion from color to monochrome is required; and based on determining that the conversion is required, causing the printer to print a converted image, the converted image being obtained by converting an image indicated by the intermediate image data received from the operating system from color to monochrome.

According to the support program disclosed in the present specification, the information processing device executes a process for causing a printer to print a converted image after being converted to monochrome by a support program when there is a print instruction to the general-purpose print program and the color-to-monochrome conversion is required for an image to be printed. Therefore, even if the general-purpose print program of the operating system does not support the color-to-monochrome conversion function, a monochrome image can be printed when the color-to-monochrome conversion is required for the image to be printed.

A control method for achieving the above program and a computer-readable storage medium for storing the program are also novel and useful.

According to the technique disclosed in the present specification, a technique that can be expected to print an appropriate image even if an information processing device in which an OS standard general-purpose print program is installed is passed through the OS standard general-purpose print program is achieved.

Hereinafter, a personal computer (hereinafter referred to as "PC") that uses a support program of the present illustrative embodiment will be described in detail with reference to the attached drawings. The present specification discloses a support program executed by a PC connected to a printer having a printing function.

Overall Configuration

Figure 1:
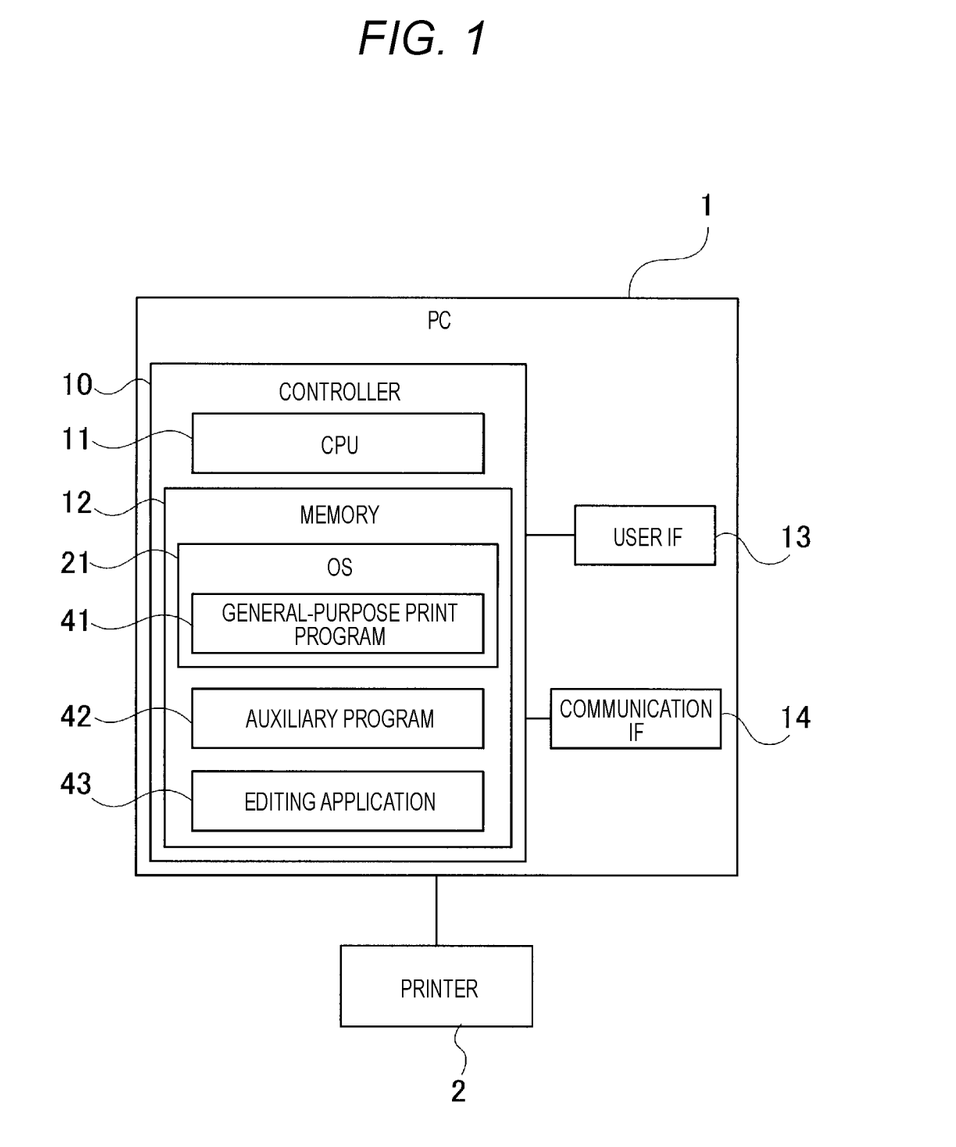
FIG. 1 is a block diagram showing an outline of the electrical configuration of a PC.

As shown in FIG. 1, a PC 1 of the present illustrative embodiment includes a controller 10 including a CPU (an abbreviation of "central processing unit") 11, and a memory 12. The PC 1 is an example of an information processing device. The CPU 11 is an example of a computer. Further, the PC 1 includes a user interface (hereinafter referred to as "user IF") 13 and a communication interface (hereinafter referred to as "communication IF") 14, which are electrically connected to the controller 10. The controller 10 in FIG. 1 is a general term for hardware and software used for controlling the PC 1 and does not necessarily represent single hardware that actually exists in the PC 1.

The CPU 11 executes various processes according to the program read from the memory 12 and based on the user's operation. Various programs including various application programs (hereinafter referred to as "applications") and various data are stored in the memory 12. The memory 12 is also used as a work area when various processes are executed. A buffer included in the CPU 11 is also an example of the memory. An example of the memory 12 is not limited to the ROM (an abbreviation of "read only memory"), RAM (an abbreviation of "random access memory"), HDD (an abbreviation of "hard disk drive"), and the like built in the PC 1 and may be a storage medium that can be read and written by the CPU 11, such as a recording medium such as a CD-ROM or a DVD-ROM.

The user IF 13 includes hardware that displays a screen for notifying the user of information and hardware that receives operations by the user. The user IF 13 may be a set including a display capable of displaying information, and a mouse, keyboard, or the like having an input reception function or may be a touch panel having a display function and an input reception function.

The communication IF 14 includes hardware for communicating with an external device such as a printer 2. The communication standard of the communication IF 14 is Ethernet (registered trademark), Wi-Fi (registered trademark), USB (an abbreviation of "universal serial bus"), and the like. The PC 1 may include a plurality of communication IFs 14 corresponding to a plurality of communication standards.

As shown in FIG. 1, the memory 12 of the PC 1 stores an operating system (hereinafter referred to as "OS") 21 containing a general-purpose print program 41, an auxiliary program 42, and an editing application 43. The auxiliary program 42 is an example of a support program. The editing application 43 is an example of an application program. The OS 21 is, for example, Windows (registered trademark), macOS (registered trademark), Linux (registered trademark), iOS (registered trademark), or Android (registered trademark).

The general-purpose print program 41 is an OS standard program for causing various printers such as the printer 2 to execute printing based on a user's instruction. The general-purpose print program 41 of the present illustrative embodiment is a program including the function of generating intermediate image data based on the image data to be printed.

The general-purpose print program 41 supports functions that can be commonly used by printers of a plurality of types of models provided by vendors of various printers. The general-purpose print program 41 does not correspond to all the functions unique to various printers, and the supporting functions are limited to general-purpose ones.

The auxiliary program 42 is a program or a group of programs that execute the processing based on the instruction from the OS 21 accompanying the processing of the general-purpose print program 41 and is an application that supports the control of the target hardware. The auxiliary program 42 of the present illustrative embodiment corresponds to the model of the printer 2 connected to the PC 1 and is started from the general-purpose print program 41, for example, when the general-purpose print program 41 is used to receive an instruction to cause the printer 2 to perform printing. The auxiliary program 42 is called, for example, a print support application (abbreviated to "PSA").

The auxiliary program 42 can receive a plurality of types of commands from the general-purpose print program 41 and executes various processes based on the received commands. The auxiliary program 42 may be a combination of a plurality of programs, each of which receives an execution command, or may be a single program that can execute different processes according to the command.

The auxiliary program may be a program prepared for each printer type by the printer vendor. For example, an auxiliary program for an inkjet printer and an auxiliary program for a laser printer may be prepared respectively. For example, when a new printer is connected to the PC 1, the OS 21 of the PC 1 downloads an appropriate auxiliary program from a server or the like according to the type of the connected printer and installs the downloaded auxiliary program into its own device. Then, the OS 21 stores the identification information of the installed auxiliary program in association with the printer information of the newly connected printer in the memory 12. There may be an auxiliary program prepared not only for each printer type but also for each printer model or each printer model series.

The editing application 43 is, for example, an application for creating and editing image data and document data. The editing application 43 may be, for example, Word or PowerPoint manufactured by Microsoft (registered trademark), or may be an application provided by the vendor of the printer 2. The editing application 43 accepts a user operation including an instruction to cause the printer 2 to perform a predetermined operation. Specifically, the editing application 43 receives, for example, a print execution instruction to cause the printer 2 to execute printing via the user IF 13.

The printer 2 of the present illustrative embodiment is a device having a printing function. The PC 1 can communicate with the printer 2 via the communication IF 14. The printer 2 receives print data from, for example, the PC 1 or the like, and executes printing based on the received print data.

Printing Procedure

Subsequently, the printing procedure including the operation of the auxiliary program 42 of the present illustrative embodiment will be described. The procedure described below is a procedure for causing the printer 2 to perform printing via the general-purpose print program 41, and the procedure includes a process for converting an image to be printed from color to monochrome.

The general-purpose print program 41 of the present illustrative embodiment does not support the function of converting an image from color to monochrome. Therefore, it is necessary to convert by something other than the general-purpose print program 41. In the present illustrative embodiment, there are two methods for converting an image from color to monochrome: a method of converting an image by the auxiliary program 42 and a method of converting an image by the printer 2.

Figure 2A:
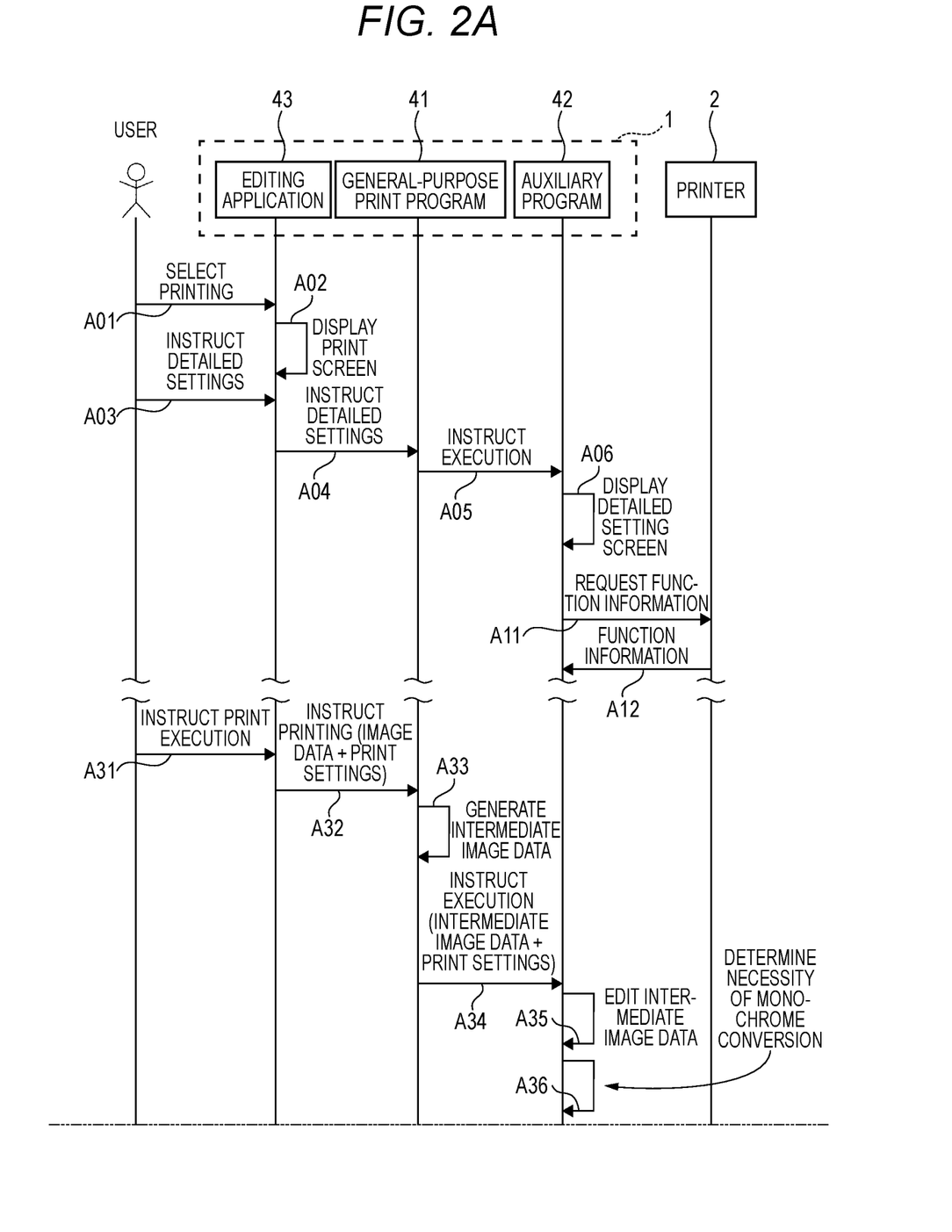
FIGS. 2A and 2B are sequence diagrams showing an example of a procedure for printing operation by each program in a first mode.
Figure 2B:
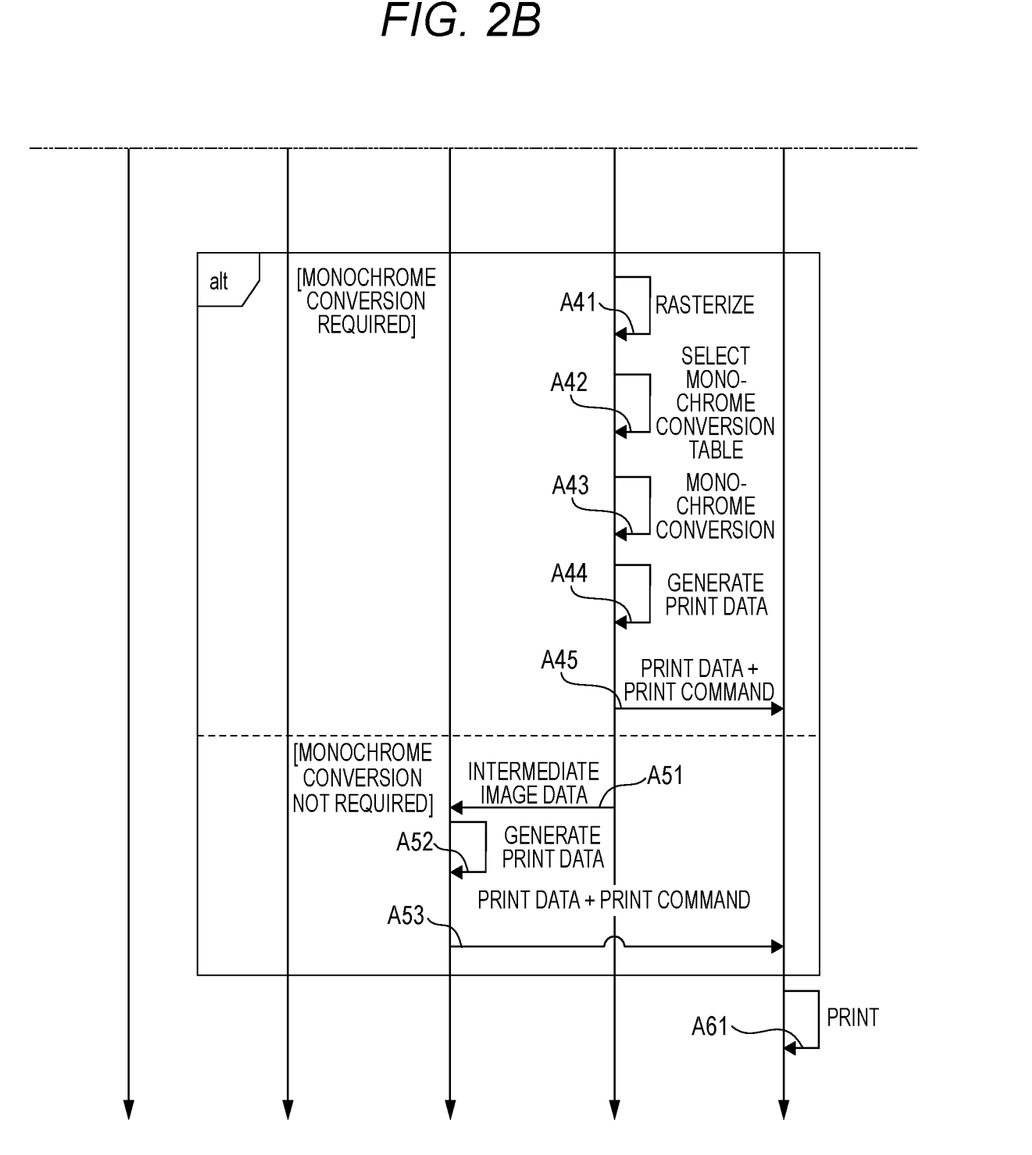
Figure 3A:
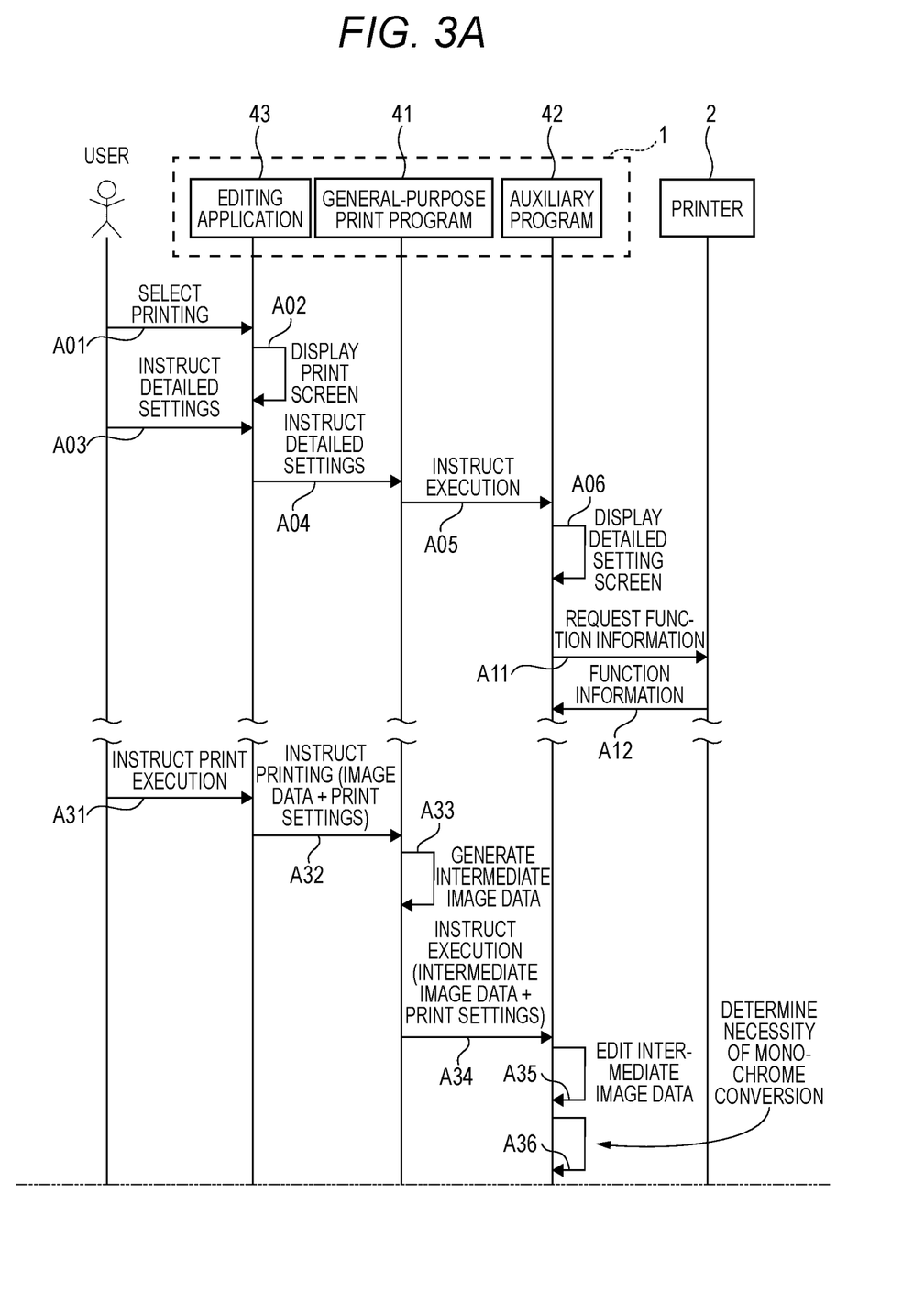
FIGS. 3A and 3B are sequence diagrams showing an example of a procedure of printing operation by each program in a second mode.
Figure 3B:
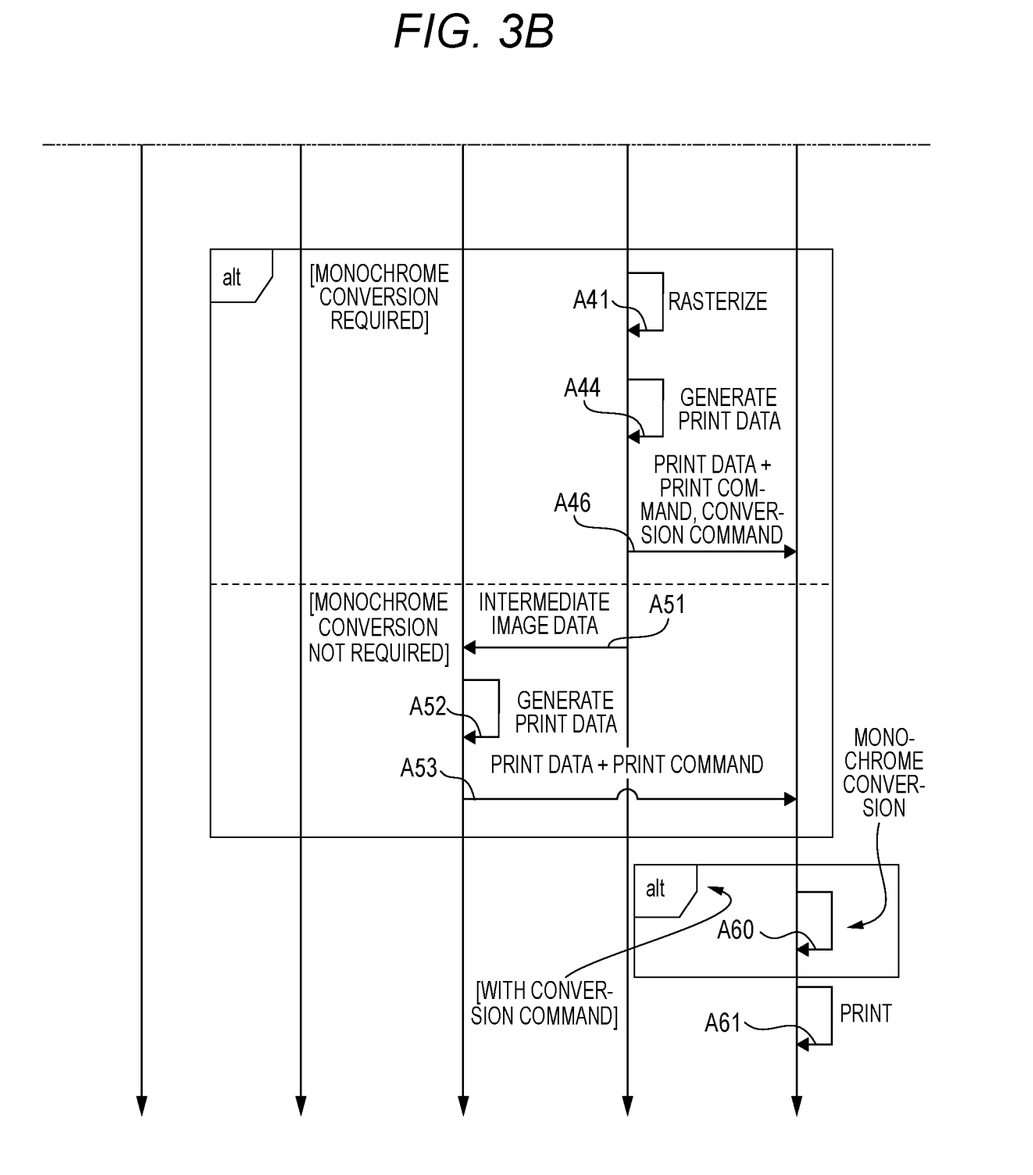

In the present specification, the conversion from color to monochrome will be described with reference to the sequence diagram of FIGS. 2A and 2B with the method using the auxiliary program 42 as a first mode, and described with reference to the sequence diagram of FIGS. 3A and 3B with the method using the printer 2 as a second mode. FIGS. 2A to 3B show the operation in an application for receiving a print instruction, such as the editing application 43, when a print execution instruction to cause the printer 2 to perform printing using the general-purpose print program 41 is received, and the auxiliary program 42 corresponding to the printer 2 is installed in the PC 1.

Each processing step in the present illustrative embodiment basically indicates the processing of the CPU 11 according to a command described in a program such as the auxiliary program 42. The processing by the CPU 11 also includes hardware control using the API of the OS 21. In the present specification, the operation of each program will be described with the detailed description of the OS 21 omitted. Incidentally, "obtain" and "receive" may be used as a concept that does not necessarily require a request.

First Mode

First, the first mode of converting an image from color to monochrome using the auxiliary program 42 will be described with reference to the sequence diagram of FIGS. 2A and 2B.

The editing application 43 accepts the creation and editing of sentences, charts, and the like based on the user's instructions. When the editing application 43 receives an instruction regarding the printing of the selected sentences or the like (A01), the editing application 43 displays a print screen for receiving the instruction by the user on the user IF 13 (A02). The editing application 43 receives, for example, a print execution instruction, a basic print setting instruction, and an instruction to start accepting detailed print settings on the print screen.

When the editing application 43 receives an instruction to start accepting detailed print settings while the printer 2 is selected on the displayed print screen (A03), the editing application 43 passes the received detailed setting instruction information to the OS 21. When the OS 21 receives an instruction for detailed settings related to printing using the general-purpose print program 41, the OS 21 executes the general-purpose print program 41 and passes an instruction to start accepting detailed print settings to the general-purpose print program 41 (A04). When the general-purpose print program 41 receives the instruction to start accepting the detailed print settings, the general-purpose print program 41 passes the execution instruction to accept detailed print settings to the auxiliary program 42 corresponding to the printer 2 which is the selected printer (A05).

The auxiliary program 42 starts the operation based on the execution instruction from the general-purpose print program 41 and displays a setting screen for accepting an input operation of detailed print settings on the user IF 13 (A06). The auxiliary program 42 displays, for example, a setting screen that accepts compatible detailed settings based on the model information of the printer 2 and accepts user operations.

Figure 4:
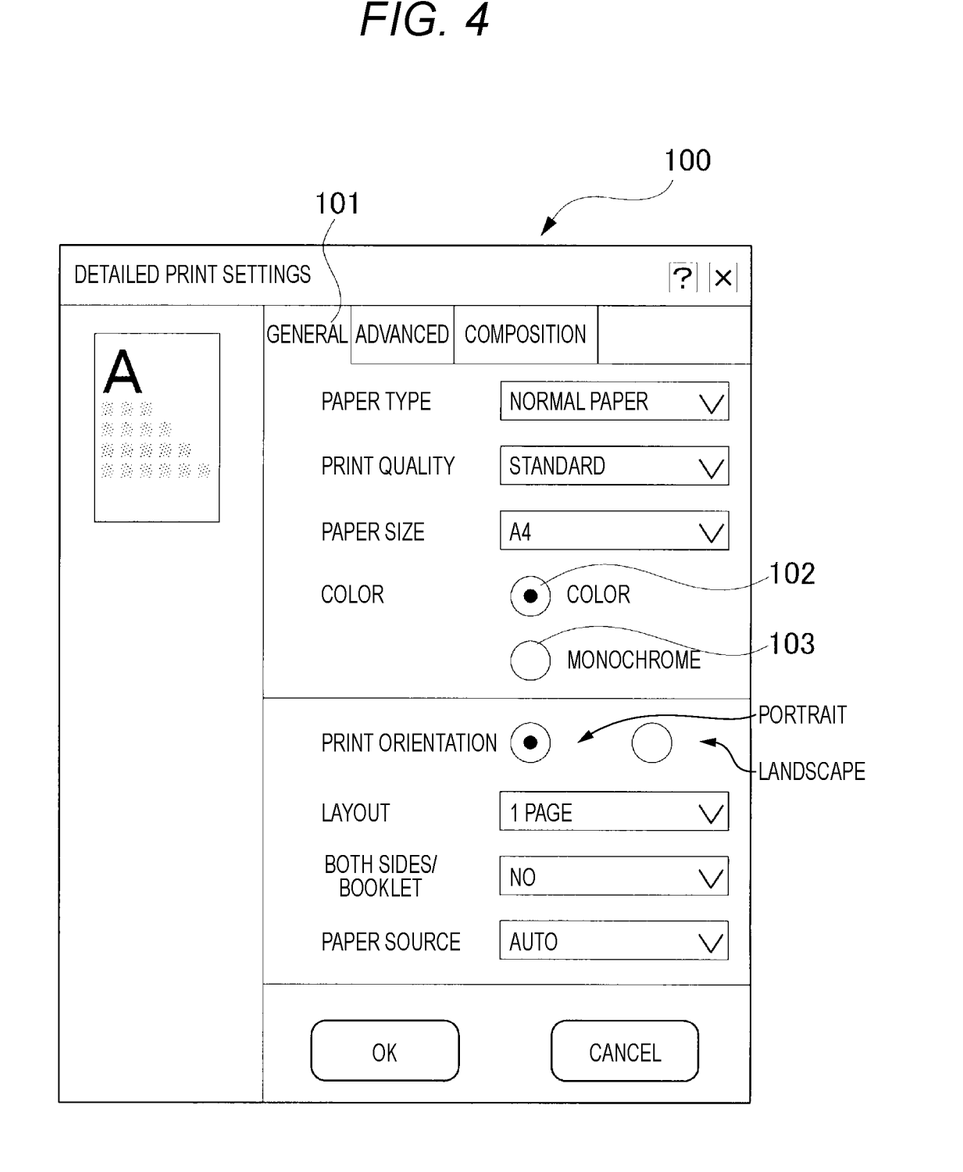
FIG. 4 is an explanatory diagram illustrating an example of a setting screen.

FIG. 4 shows a setting screen 100 which is an example of the setting screen displayed in A06. The setting screen 100 is provided with a plurality of tabs. FIG. 4 shows a state in which a general tab 101 that accepts general print settings is selected. The setting items of the general tab 101 include color settings for the output image, and the user IF 13 displays a color option 102 for setting the output of the color image and a monochrome option 103 for setting the output of the monochrome image.

Further, the auxiliary program 42 requests the function information from the printer 2 (A11) via the communication IF 14 after starting the display of the setting screen 100 in A06 and receives the function information from the printer 2 (A12). The function information includes information indicating the model of the printer 2 and information indicating the presence or absence of the function of the printer 2. The information indicating the presence or absence of the function of the printer 2 includes, for example, information on whether or not the printer has a conversion function for converting an image from color to monochrome. Further, for example, there is information on whether or not the printer has a decompression function for compressed data, and in this case, information indicating the type of compression method that can be supported as the decompression function is also included. The auxiliary program 42 stores the function information of the printer 2 in the memory 12.

Communication between the auxiliary program 42 and the printer 2 may be performed, for example, via the OS 21, or the auxiliary program 42 may directly communicate with the printer 2 using a MIB (abbreviation of Management Information Base). When the communication is performed via the OS 21, the auxiliary program 42 and the printer 2 communicate with each other according to the communication protocol of the OS 21 such as IPP (abbreviation of Internet Printing Protocol).

After that, when the instruction to end the detailed setting 100 is received by the operation to the OK button shown in FIG. 4, the auxiliary program 42 ends the display of the setting screen 100 and passes the selected print setting and the end notification to the general-purpose print program 41. Upon receiving the end notification from the auxiliary program 42, the general-purpose print program 41 passes the end notification to the editing application 43.

Next, when the editing application 43 receives the print execution instruction by the user on the print screen (A31), the editing application 43 passes the print instruction to the general-purpose print program 41 (A32). The general-purpose print program 41 obtains information indicating image data to be printed and information indicating print settings in the print instruction.

The general-purpose print program 41 generates intermediate image data by converting the format of the image data included in the received print instruction into the format of the intermediate image data (A33) and generates a print job including the intermediate image data. The image data included in the editing application 43 is of various types, and the general-purpose print program 41 converts the received image data into intermediate image data suitable for generating print data. If the image data included in the print instruction is data suitable for generating the print data, the generation of the intermediate image data may be omitted and the image data may be used as the intermediate image data. The intermediate image data is, for example, XPS data.

The general-purpose print program 41 further outputs an execution instruction to the auxiliary program 42 (A34) and operates the auxiliary program 42. In the execution instruction, the generated intermediate image data and the print setting information are passed to the auxiliary program 42. Since the auxiliary program 42 obtains the intermediate image data indicating the image to be printed from the general-purpose print program 41 included in the OS 21 in A34, A34 is an example of the obtainment process.

The auxiliary program 42 edits the intermediate image data based on the print settings (A35). For example, if the print setting includes a compositing instruction, a composite image obtained by compositing the content shown in the compositing information with the image shown in the intermediate image data based on the intermediate image data received in A34 and the compositing information is generated. The content to be composited may be an image, a figure, or a character. Also, if the print settings include an aggregation setting for aggregating images of multiple pages onto a single sheet, the so-called Nin1 setting, the image on each page shown in the intermediate image data is resized to be small to generate an aggregated image in which images corresponding to N pages are arranged so as to fit on one sheet, that is, N pages of images are aggregated into one page of images. The process of generating the aggregated image in A35 is an example of the aggregation process.

The auxiliary program 42 further determines whether or not the image shown in the intermediate image data needs to be converted from color to monochrome (A36). Specifically, whether or not conversion is required is determined based on the printer capability and print settings. For example, if the printer 2 is a monochrome printer, it is determined that conversion is necessary. Further, when the setting for outputting a monochrome image is enabled in the print settings, for example, when the monochrome option 103 is selected on the setting screen 100, it is determined that conversion is necessary. Of course, if the image shown in the intermediate image data is monochrome instead of color, it may be determined that conversion is unnecessary regardless of the printer's capability and print settings. A36 is an example of the determination process. If the capability of the printer 2 has not been obtained at the stage of executing A36, the capability of the printer 2 may be obtained before A36 is executed.

When it is determined that color-to-monochrome conversion is necessary (Alt: monochrome conversion required), the auxiliary program 42 executes rasterization based on the intermediate image data edited in A35 to generate raster data (A41). By rasterizing with the auxiliary program 42, the degree of freedom is large as compared with the case of rasterizing with the general-purpose print program 41, and the possibility that print data suitable for printing by the printer 2 is generated increases.

The auxiliary program 42 further selects a conversion table used for converting the image shown in the raster data from color to monochrome (A42). The auxiliary program 42 has a plurality of types of conversion tables. For example, an appropriate conversion table is selected depending on whether the coloring material used for printing is toner or ink. The type of the coloring material can be determined based on, for example, the function information obtained from the printer 2, specifically, the information indicating the model of the printer and the information indicating the cartridge. Further, the function information may include information directly indicating the type of the coloring material. Since the tint is greatly different depending on the coloring material, high-quality printing can be expected by performing the conversion using different conversion tables according to the type of coloring material. Also, for example, an appropriate conversion table is selected depending on whether or not the eco setting included in the print setting is enabled. The eco setting is a setting for reducing the consumption of the coloring material and is an example of a specific setting. When the eco setting is enabled, the consumption of the coloring material can be reduced by performing the conversion using a conversion table in which the concentration is lower than when the eco setting is disabled.

After that, the auxiliary program 42 converts the image shown in the raster data from color to monochrome using the selected conversion table (A43). A43 is an example of the conversion process. The raster data to be converted is data based on the intermediate image data after editing based on the print settings, and the raster data after conversion is also data indicating a monochrome image reflecting the print settings such as aggregation and composition.

After that, the auxiliary program 42 generates print data based on the raster data after conversion in A43 (A44). The print data generated in A44 is data in a format that can be used for printing by the printer 2, and is, for example, PDL data dedicated to the model of the printer 2. The print data generated by the auxiliary program 42 may be data in a format that can be used for printing on a printer other than the model of the printer 2.

The auxiliary program 42 transmits the print data generated in A44 to the printer 2 together with the print command instructing the execution of printing (A45). The processes from A41 to A45 are examples of processes for causing the printer 2 to print the converted image.

The printer 2 that has received the print data and the print command from the auxiliary program 42 executes the printing of the image shown in the print data based on the received print command (A61), and the printing procedure is completed. As a result, when a conversion from color to monochrome is required, a printed matter on which a monochrome image is printed is generated.

Further, when the print data is transmitted to the printer 2, the auxiliary program 42 responds to the general-purpose print program 41 with a transmission completion code indicating that the transmission of the print data has been completed. The general-purpose print program 41, which has received the code indicating that the transmission has been completed, does not perform the process for transmitting the print data to the printer 2, and the printing procedure ends.

When generating print data, the auxiliary program 42 may compress the converted raster data on the condition that the printer 2 has a data decompression function, and may generate print data based on the compressed data. By transmitting the compressed data to the printer 2, the communication load can be reduced.

On the other hand, when it is determined that the conversion from color to monochrome is unnecessary (Alt: monochrome conversion not required), the auxiliary program 42 passes the intermediate image data edited in A35 to the general-purpose print program 41 (A51). The general-purpose print program 41 that has received the intermediate image data from the auxiliary program 42 performs rasterization based on the intermediate image data received from the auxiliary program 42 to generate raster data and generates print data based on the raster data (A52).

The print data generated by the general-purpose print program 41 is print data in a format that can be used for printing by various printers, and is, for example, PWG Raster data or PDF data. If rasterization is performed by the general-purpose print program 41, the processing of the auxiliary program 42 is small, and it is expected that the processing time of the auxiliary program 42 will not increase.

Then, the general-purpose print program 41 transmits the print data generated in A52 to the printer 2 together with the print command (A53). The printer 2 that has received the print data and the print command from the general-purpose print program 41 executes the printing of the image shown in the print data based on the received print command (A61). This ends the printing procedure.

In the first mode, when the conversion from color to monochrome is required, the auxiliary program 42 executes rasterization based on the edited intermediate image data to generate raster data in A41 and transmits the print data generated from the raster data to the printer 2 in A45. However, even when the conversion from color to monochrome is not necessary, that is, regardless of whether the conversion from color to monochrome is necessary, the auxiliary program 42 may execute rasterization based on the edited intermediate image data to generate raster data, and transmit the print data generated from the raster data to the printer 2.

Second Mode

Subsequently, a second mode of converting an image from color to monochrome using the printer 2 will be described with reference to the sequence diagram of FIGS. 3A and 3B. In FIGS. 3A and 3B, the same process as in the first mode is assigned the same number and the description thereof will be omitted. Further, in the second mode, the processes after determining the necessity of monochrome conversion in the auxiliary program 42 are different from those in the first mode. Therefore, the descriptions up to A36 will be omitted.

When it is determined that conversion from color to monochrome is necessary (Alt: monochrome conversion required), the auxiliary program 42 executes rasterization based on the edited intermediate image data to generate raster data (A41), as in the first mode. After that, the auxiliary program 42 generates print data without performing a monochrome conversion process on the raster data (A44).

Then, the auxiliary program 42 transmits the generated print data to the printer 2 in association with the print command instructing the execution of printing and the conversion command instructing the conversion to monochrome (A46). The conversion command may be transmitted in association with the print command or print data, and does not need to be transmitted at the same time as the print command or print data. For example, the conversion command may be transmitted before the transmission of the print command or the print data. In the second mode, the conversion command is transmitted to the printer 2 without performing the conversion from color to monochrome. The process of transmitting the conversion command associated with the print data to the printer 2 is an example of the process for causing the printer 2 to print the converted image.

When it is determined that the conversion from color to monochrome is unnecessary (Alt: monochrome conversion not required), the auxiliary program 42 passes the intermediate image data edited in A35 to the general-purpose print program 41 (A51), as in the first mode. Then, the general-purpose print program 41 that has received the intermediate image data from the auxiliary program 42 generates print data based on the intermediate image data received from the auxiliary program 42 (A52), and transmits the generated print data together with the print command to the printer 2 (A53).

The printer 2 that has received the print data and the print command from the auxiliary program 42 converts the image to be printed shown in the received print data from color to monochrome before printing if the conversion command is associated (Alt: with conversion command) (A60). After that, the printer 2 executes the printing of the image shown in the print data based on the received print command (A61). As a result, when conversion from color to monochrome is required, a printed matter on which a monochrome image is printed is generated.

In the second mode, the auxiliary program 42 does not convert the image into a monochrome image and transmits a conversion command to the printer 2, and the printer 2 converts the image from color to monochrome for printing. Therefore, the load of the auxiliary program 42 is reduced. On the other hand, if the auxiliary program 42 converts the image into a monochrome image and transmits the print data based on the converted image to the printer 2 as in the first mode, the printer 2 does not need to perform the conversion, and the load of the printer 2 is reduced, which can contribute to memory saving. It can also be used with printers that do not have a color-to-monochrome conversion function.

In the second mode, the auxiliary program 42 may determine whether or not the printer 2 has a conversion function to convert to a monochrome image. For example, the auxiliary program 42 may not accept the monochrome option 103 as a print setting when the printer 2 does not have the color-to-monochrome conversion function.

Further, in the second mode, when it is determined that the conversion from color to monochrome is required, the auxiliary program 42 converts the data into raster data and transmits the print data to the printer 2 together with the conversion command, but may transmit only the conversion command without converting to raster data and transmitting the print data. In this case, the intermediate image data edited in A35 is returned to the general-purpose print program 41 without being rasterized, and rasterization may be performed by the general-purpose print program 41 to generate the print data and the print data may be transmitted to the printer 2 in the same manner as when it is determined that conversion from color to monochrome is unnecessary.

As described in detail above, the PC 1 executes the process for causing the printer to print a converted image after conversion to monochrome by the auxiliary program 42 when the image to be printed needs to be converted from color to monochrome. As a result, even if the general-purpose print program 41 does not support the color-to-monochrome conversion function, a monochrome image can be printed when color-to-monochrome conversion is required.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the device connected to the PC 1 is not limited to a printer and may be a device having a printing function, such as a multifunction peripheral, a copying machine, or a facsimile machine. Further, the number of printers connected to the PC 1 is not limited to the example shown in the drawing and may be two or more.

Also, the illustrated display screens are examples and are not limited thereto. For example, the arrangement and expression of each image and each button are not limited to the illustrated examples. For example, the auxiliary program 42 may perform the monochrome conversion in A43 of FIG. 2B, then perform a preview display of the converted monochrome image, and allow the user to select whether or not to continue the printing procedure.

Further, in the above-described illustrative embodiment, the auxiliary program 42 has a plurality of conversion tables, and an appropriate conversion table is selected and used in A42, but there may be only one conversion table and the conversion table may be always used.

Further, in the above-described illustrative embodiment, only the printing operation is described in detail as the operation of the auxiliary program 42, but the auxiliary program 42 may have another role. Further, the program that executes the processing of the present illustrative embodiment is not limited to the auxiliary program 42 and may be any program that receives instructions from the OS 21 or the general-purpose print program 41 when printing using the general-purpose print program 41. For example, a print workflow application (Print Workflow) whose specifications have been released by Microsoft may be used.

Further, the execution timing of the auxiliary program 42 is not limited to the example of the illustrative embodiment. For example, the execution may be directly instructed by the OS 21 and executed, or it may be a resident auxiliary program 42. When resident, the auxiliary program 42 may perform the above-described operation in response to the execution command.

Further, in any flowchart disclosed in the illustrative embodiment, the plurality of processes in any plurality of steps can be changed to any execution order or executed in parallel as long as the processing contents do not conflict with each other.

Further, the processes disclosed in the illustrative embodiment may be executed by hardware such as a single CPU, a plurality of CPUs, an ASIC, or a combination thereof. Further, the processes disclosed in the illustrative embodiment can be achieved in various aspects such as a recording medium in which a program for executing the process is recorded, or a method.

What is claimed is:

1. A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform:
based on a print instruction being output from an application program installed in the information processing device and transferred to the general-purpose print program to cause the printer to perform printing,
receiving, from the general-purpose print program of the operating system, intermediate image data according to the print instruction;
determining whether a conversion from color to monochrome is required, based on at least the received intermediate image data received from the general-purpose print program of the operating system; and
based on determining that the conversion is required,
converting an image indicated by the intermediate image data received from the general-purpose print program of the operating system from color to monochrome; and
transmitting print data indicating the converted image to the printer, thereby causing the printer to print the converted image.

2. The non-transitory computer-readable medium according to claim 1, wherein in the converting, the support program causes the computer to perform:
in a case a type of a coloring material used for printing is a first type, converting the image from color to monochrome by using a first conversion table; and
in a case the type of the coloring material used for printing is a second type, converting the image from color to monochrome by using a second conversion table.

3. The non-transitory computer-readable medium according to claim 1,
wherein a print setting according to the print instruction includes a specific setting indicating whether to reduce consumption of a coloring material, and
wherein in the converting, the support program causes the computer to perform:
in a case the specific setting included in the print setting according to the print instruction indicates that the consumption of the coloring material is to be reduced, converting the image from color to monochrome in a first concentration by using a specific table to obtain the converted image having a first concentration; and
in a case the specific setting indicates that the consumption of the coloring material is not to be reduced, converting the image from color to monochrome by using a third conversion table to obtain the converted image having a second concentration, the third conversion table being different from the specific table, the first concentration being lower than the second concentration.

4. The non-transitory computer-readable medium according to claim 1, wherein in the converting, the support program causes the computer to perform:
converting the image into raster data rasterized based on the intermediate image data received from the operating system and converting the image indicated by the converted raster data from color to monochrome.

5. The non-transitory computer-readable medium according to claim 1, wherein the support program, when executed by the computer, further causes the computer to perform:
based on determining that the conversion is unnecessary, returning the intermediate image data received from the operating system to the operating system, to cause the operating system, to which the intermediate image data has been returned, to generate print data based on the intermediate image data and to transmit the generated print data to the printer.

6. The non-transitory computer-readable medium according to claim 1, wherein the support program, when executed by the computer, further causes the computer to perform:
in a case it is necessary to aggregate images of a plurality of pages into images of one page, generating an aggregated image by aggregating the images of a plurality of pages shown in the intermediate image data received from the operating system into the images of one page, and
wherein the support program causes the computer to perform:
after the aggregating, based on determining that the conversion is required, converting the generated aggregated image from color to monochrome in the conversion process.

* * * * *